United States Patent
Lacefield

(10) Patent No.: US 6,769,978 B2
(45) Date of Patent: Aug. 3, 2004

(54) METHOD AND APPARATUS FOR CONTROLLING AIRFLOW IN A VEHICULAR HVAC SYSTEM

(75) Inventor: Michael Edward Lacefield, Lawrenceburg, KY (US)

(73) Assignee: Modine Manufacturing Company, Racine, WI (US)

( * ) Notice: Subject to any disclaimer, the term of this patent is extended or adjusted under 35 U.S.C. 154(b) by 13 days.

(21) Appl. No.: 10/036,765

(22) Filed: Dec. 21, 2001

(65) Prior Publication Data

US 2003/0119439 A1 Jun. 26, 2003

(51) Int. Cl.$^7$ .............................................. B60H 1/26
(52) U.S. Cl. .................................................. 454/121
(58) Field of Search ................................ 454/121, 159, 454/160, 161; 165/42, 43

(56) References Cited

U.S. PATENT DOCUMENTS

| | | | |
|---|---|---|---|
| 3,661,069 A | | 5/1972 | Grosseau |
| 4,340,112 A | * | 7/1982 | Sutoh et al. ................. 165/229 |
| 4,406,214 A | | 9/1983 | Sakurai |
| 4,413,550 A | | 11/1983 | Piano |
| 4,762,169 A | * | 8/1988 | Andersen et al. ........... 165/203 |
| 5,042,566 A | | 8/1991 | Hildebrand |
| 5,086,628 A | * | 2/1992 | Hashimoto .................... 62/244 |
| 5,186,237 A | * | 2/1993 | Adasek et al. ................ 165/42 |
| 5,217,405 A | | 6/1993 | Tanaka |
| 5,228,475 A | | 7/1993 | Trill |
| 5,350,335 A | | 9/1994 | Anderson |
| 5,601,142 A | | 2/1997 | Hildebrand et al. |
| 5,673,964 A | | 10/1997 | Roan et al. |
| 5,902,181 A | | 5/1999 | Bain |
| 5,967,890 A | | 10/1999 | Loup et al. |

FOREIGN PATENT DOCUMENTS

| | | | | |
|---|---|---|---|---|
| JP | 59-11911 | * | 1/1984 | .................. 454/121 |

* cited by examiner

Primary Examiner—Harold Joyce
(74) Attorney, Agent, or Firm—Wood, Phillips, Katz, Clark & Mortimer

(57) ABSTRACT

The present disclosure relates to an airflow control apparatus having a plurality of doors and outlets for controlling the airflow in a vehicular HVAC system. In one aspect, the apparatus (100) has a first chamber (106) controlled by a first door (126) and having a first outlet (110) and a first passage (127). A second chamber (129) is coupled to the first passage and also controlled by the first door. The second chamber has a second outlet (130) and a third outlet (160) which are each controlled by the second and third doors (232, 242). According to another aspect, a method of controlling airflow in a vehicular HVAC system is disclosed. The method comprises the steps of receiving (702) airflow into a first chamber; controlling the airflow out of the first chamber with a first door; controlling (704) the airflow from a second chamber to a driver zone with a second door; and controlling (706) the airflow from said second chamber to a passenger zone with a third door.

35 Claims, 5 Drawing Sheets

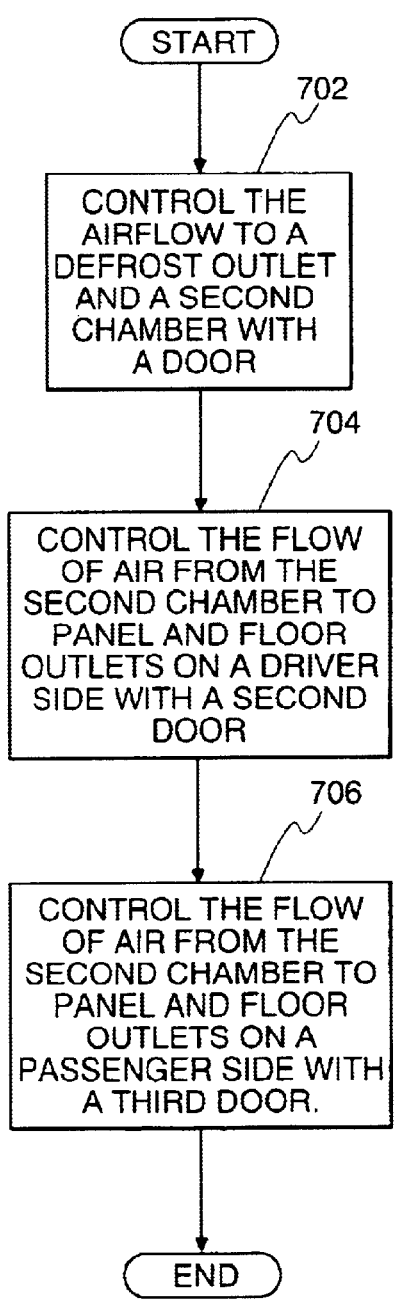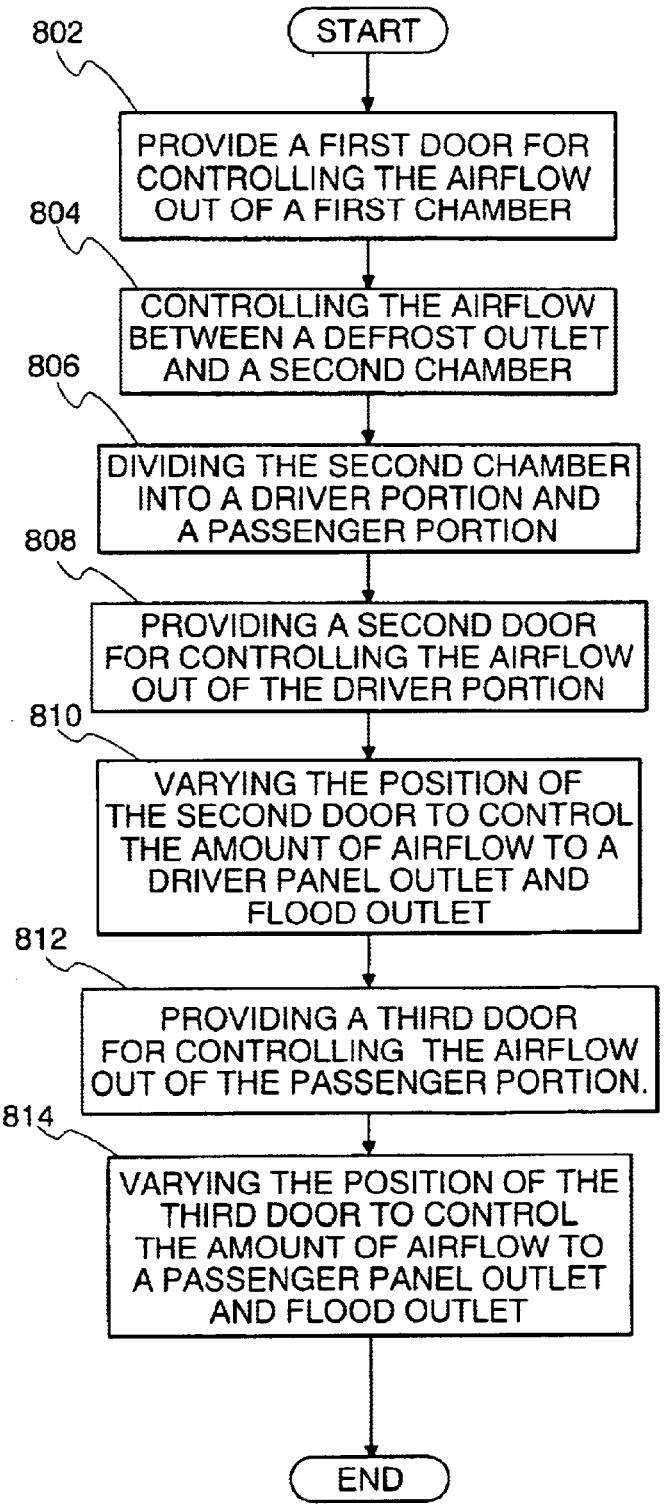

US 6,769,978 B2

METHOD AND APPARATUS FOR CONTROLLING AIRFLOW IN A VEHICULAR HVAC SYSTEM

FIELD OF THE INVENTION

This invention generally relates to an apparatus for controlling the airflow in a vehicular HVAC system, and more particularly to a method and apparatus for controlling airflow to passenger and driver compartments in a vehicle.

BACKGROUND OF THE INVENTION

As automotive vehicles continue to improve, there is an increasing demand for improved ventilation systems within vehicles. One such improvement in recent years is to provide ventilation ducts for passenger compartments in the rear of a vehicle, for example. Also, separate temperature controls for drivers and passengers have been used to allow a driver and a passenger to create separate temperature zones within the vehicle. Similarly, separate fan controls for the driver and passenger sides have been used. However, such systems fail to allow driver and passenger controls to regulate the airflow to different locations affecting the driver and passenger areas, respectively.

Accordingly, there is a need to separately control the airflow to different portions of the driver side and passenger side of a vehicle.

SUMMARY OF THE INVENTION

The present disclosure relates to an airflow control apparatus having a plurality of doors and outlets for controlling the airflow in a vehicular HVAC system. In one aspect, the apparatus comprises a first chamber controlled by a first door and having a first outlet and a first passage. A second chamber is coupled to the first passage and also controlled by the first door. The second chamber has a second outlet and a third outlet which are each controlled by the second and third doors.

According to another aspect of the invention, an airflow control apparatus comprises a first outlet controlled by a first door; a second outlet controlled by a second door and a third door, wherein the second and third door control the amount of airflow through the second outlet to a first zone and a second zone, respectively. Similarly, a third outlet is controlled by the second door and the third door, wherein the second and third door also control the amount of airflow through the third outlet to a third zone and a fourth zone, respectively.

According to another aspect of the invention, an airflow control apparatus comprises a first door movable between a first position and a second position for controlling the amount of airflow to a first outlet and a first passage. The apparatus further includes a second door movable between a first position and a second position for controlling the amount of airflow received from the first passage and provided to a driver side of a vehicle by way of a second outlet and a third outlet. Finally, a third door is movable between a first position and a second position for controlling the amount of airflow received from the first passage and provided to a passenger portion of a vehicle by way of the second outlet and the third outlet.

According to yet another aspect of the invention, a method of controlling airflow in a vehicular HVAC system is disclosed. The method comprises the steps of receiving airflow into a first chamber; controlling the airflow out of the first chamber with a first door; controlling the airflow from a second chamber to a driver zone with a second door; and controlling the airflow from said second chamber to a passenger zone with a third door.

It is an object of the invention to provide an airflow control apparatus which separately controls the airflow to separate portions of driver and passenger zones of a vehicle.

It is a further object of the invention to provide an airflow control apparatus which controls airflow to separate portions of a sleeper module of a truck.

It is a further object of the invention to provide an airflow control apparatus which separately controls airflow to a panel outlet and floor outlet for a driver and passenger, respectively.

It is a further object of the invention to provide an airflow control apparatus which commonly controls a defrost outlet for both a passenger portion and a driver portion, and separately controls airflow (i) to a panel outlet and a floor outlet for a driver and (ii) to a panel outlet and a floor outlet for a passenger.

Other objects and advantages will become apparent from the following specification and claims taken in connection with the accompanying drawings.

BRIEF DESCRIPTION OF THE DRAWINGS

FIG. 7 is a flow chart showing a method for controlling airflow in a vehicle according to the present invention; and FIG. 8 is a flow chart showing a method for controlling airflow in a vehicle according to an alternate embodiment of the present invention.

DESCRIPTION OF THE PREFERRED EMBODIMENTS

Figure 1:
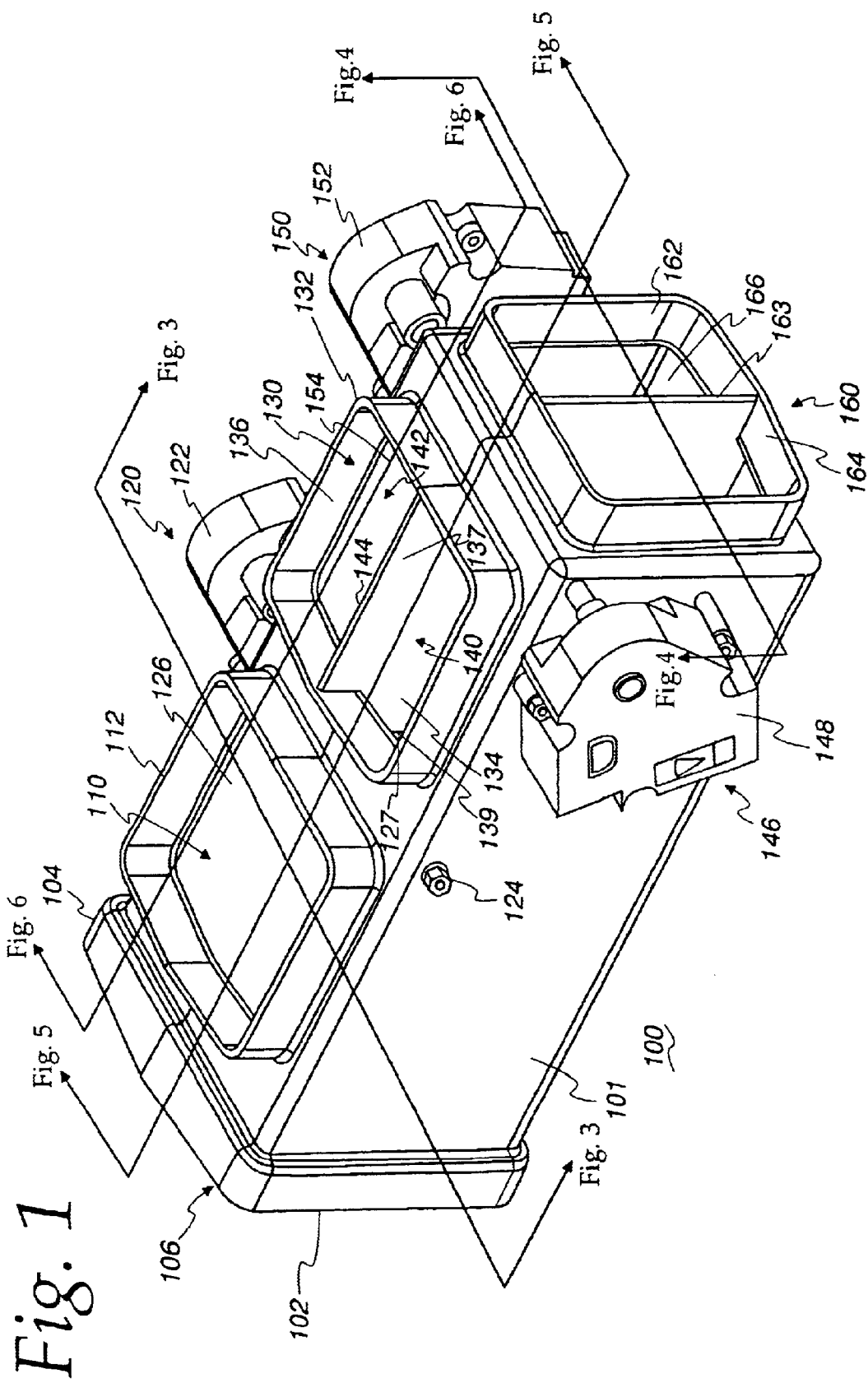
FIG. 1 is a perspective view of an apparatus for controlling airflow in a vehicle.

Turning first to FIG. 1, an apparatus for controlling airflow in a vehicle according to the present invention is shown. An airflow control apparatus 100 includes a housing 101 having an inlet 102 surrounded by an inlet shoulder portion 104. A conditioned airflow which is to be provided to the vehicle is received at the inlet 102 by way of an air duct (not shown) which is coupled to the inlet shoulder portion 104. Such an air duct could be any type of duct for channeling air from outside the vehicle or recycled air from the vehicle cabin. Airflow received at the inlet 102 enters a first chamber 106 of the housing 101. A defrost outlet 110 shown on the top of the housing 101 in FIG. 1 enables airflow to be provided to defrost ducts of the vehicle. A defrost outlet shoulder portion 112 is adapted to be coupled to a defrost duct in a vehicle, as is well known in the art. Such defrost ducts could include ducts leading to the windshield or driver and passenger doors.

Also shown in FIG. 1 is a defrost door actuator assembly 120, having a defrost door actuator 122. A defrost door hinge shaft 124 is coupled to the defrost door actuator 120 and a defrost door 126. The defrost door actuator 122 enables the defrost door 126 to move within the housing 101 to cover the defrost outlet 110 when in a horizontal position (as shown) to direct the air flow from the first chamber 106 to a first passage 127, or be moved to a vertical position to block the first passage 127 in the housing to direct the airflow from the first chamber 106 to exit the defrost outlet 110. That is, the defrost door actuator 122 moves the defrost door 126 between a first position wherein the defrost outlet 110 is blocked by the defrost door 126 to direct the airflow from the first chamber 106 to the first passage 127, and a second position wherein the defrost outlet 110 is open and the first passage 127 is blocked to direct the airflow through the defrost outlet 110.

When the defrost door 126 is in the first position blocking the defrost outlet 110, or in an intermediate position between the first and second position, a portion of the airflow is directed through the passageway 127 to a second chamber 129 in the remaining portion of the housing 101. The second chamber 129 has a panel outlet 130 which is surrounded by a panel outlet shoulder portion 132. The panel outlet shoulder portion 132 can be coupled to air ducts which direct the airflow to panel vents in a vehicle. The panel outlet 130 is divided into a driver panel outlet 134 and a passenger panel outlet 136 by a divider wall 137.

The airflow entering the second chamber 129 is divided by an input edge 138 of the divider wall 137. Accordingly, the airflow is split between a driver portion 140 and a passenger portion 142 of the second chamber 129. A panel outlet edge 144 of the divider wall 137 preferably extends to the upper edge of the panel outlet shoulder portion 132 so that the airflow exiting the driver portion 140 is directed to the driver panel outlet 134 and airflow exiting the passenger portion 142 is directed to the passenger panel outlet 136. Suitable ducts can be provided to direct the airflow from the driver panel outlet 134 to a driver zone of the vehicle and to direct airflow from the passenger panel outlet to a passenger zone of the vehicle.

Also shown in FIG. 1 are a driver door actuator assembly 146 comprising a driver door actuator 148, and a passenger door actuator assembly 150 comprising a passenger door actuator 152.

At the end portion of the housing 101 is a floor outlet 160 bounded by a floor outlet shoulder portion 162. The floor outlet shoulder portion 162 and a floor outlet edge 163 define a driver floor outlet 164 and a passenger floor outlet 166. Similar to the panel outlet 130, the floor outlet 160 is preferably coupled to suitable air ducts for separately directing airflow from the driver floor outlet 164 to a driver portion of the vehicle near the floor and from the passenger floor outlet 166 to a passenger portion of the vehicle near the floor.

Figure 2:
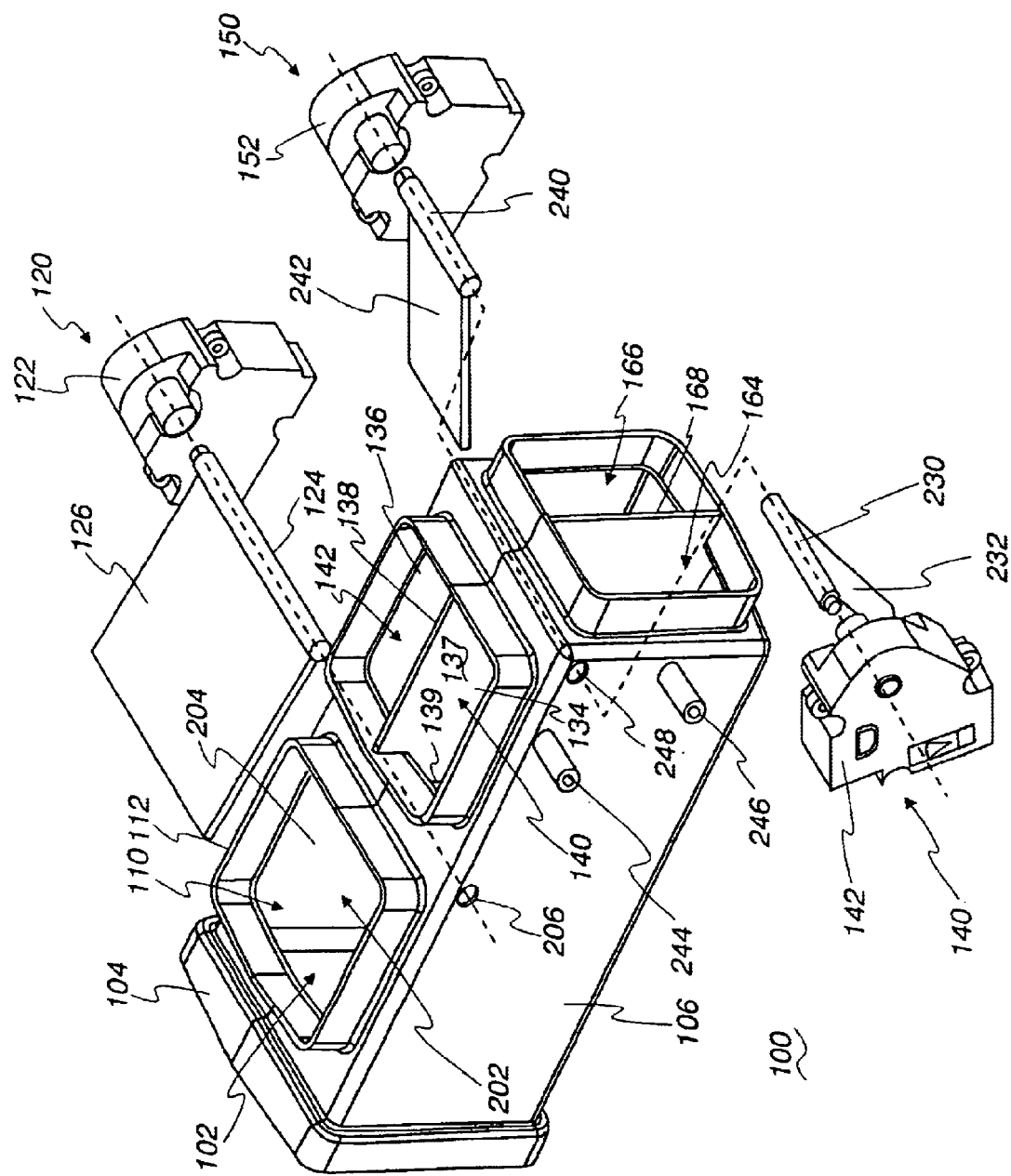
FIG. 2 is an expanded view of the apparatus for controlling airflow in a vehicle of FIG. 1.

Turning now to FIG. 2, an expanded view of the airflow control apparatus 100 shows the first chamber 106 bounded by a wall 204. Also visible in FIG. 2 is a hole 206 for receiving the defrost door hinge shaft 124. Also shown in FIG. 2 is a driver door hinge shaft 230 and a driver door 232, and a passenger door hinge shaft 240 and a passenger door 242. Shoulder portions 246 and 248 extending from the housing 101 are adapted to mount the driver door actuator 148. Similar shoulder portions (not shown) are adapted to mount the actuators 122 and 152. The door actuators 122, 142 and 152 could be any type of motor, including an electric motor, a hydraulic motor, a pneumatic motor or any other device for moving a door as shown in the present invention.

As will become more clear in reference to the remaining figures, the position of the defrost door 126 will determine the amount of airflow which passes to the defrost outlet 110 and the second chamber 129 defined by the driver portion 140 and the passenger portion 142. Any airflow that passes through the passageway 127 from the first chamber 106 and enters the driver portion 140 or the passenger portion 142 is then controlled by the driver door 232 and the passenger door 242. In particular, any airflow that enters the driver portion 140 can be selectively directed to the driver panel outlet 134 or the driver floor outlet 164 depending upon the position of the driver door 232. The driver door 232 preferably is movable between a first position wherein the driver door 232 blocks the driver panel outlet 134, and a second position where the driver door 232 blocks the driver floor outlet 164. When in the first position, substantially all of the airflow in the driver portion 140 is directed to the driver floor outlet 164, while in the second position substantially all of the airflow is directed to the driver panel outlet 134. However, it should be understood that the driver door 232 can be movable to any position between the two, allowing a varying degree of airflow to exit both the driver panel outlet 134 and the driver floor outlet 164.

Similarly, the passenger door 242 is movable between a first position blocking the passenger panel outlet 136 and a second position blocking the passenger floor outlet 166. When in the first position, substantially all of the airflow in the passenger portion 142 of the second chamber 129 is directed to the passenger floor outlet 166, while in the second position substantially all of the airflow is directed to the passenger panel outlet 136. As with the driver door 232, the passenger door 232 is also movable between the first and second position such that the amount of airflow passing through the passenger panel outlet 136 and the passenger floor outlet 166 can be selectively adjusted.

Doors 126, 232, 242 are preferably operated independent of each other thereby allowing for the airflow to the driver and passenger zones to be controlled independent of each other.

As an example with the doors 126, 232 and 242 as shown in FIGS. 1 and 2, the defrost door 126 blocks the defrost outlet 110, thereby directing all the airflow in the first chamber 106 to the second chamber 129, defined by the driver portion 140 and the passenger portion 142. Based upon the orientation of the driver door 232, the majority of the airflow passing to the driver portion 140 is directed to the driver panel outlet 134, with the remaining portion of the airflow passing through the driver floor outlet 164. In contrast, based upon the orientation of the passenger door 242, the majority of the airflow entering the passenger portion 142 is directed to the passenger floor outlet 166, with the remaining airflow passing through the passenger panel outlet 136. The airflow will become more apparent in view of the cross-sectional views shown in FIGS. 3–6.

Figure 3:
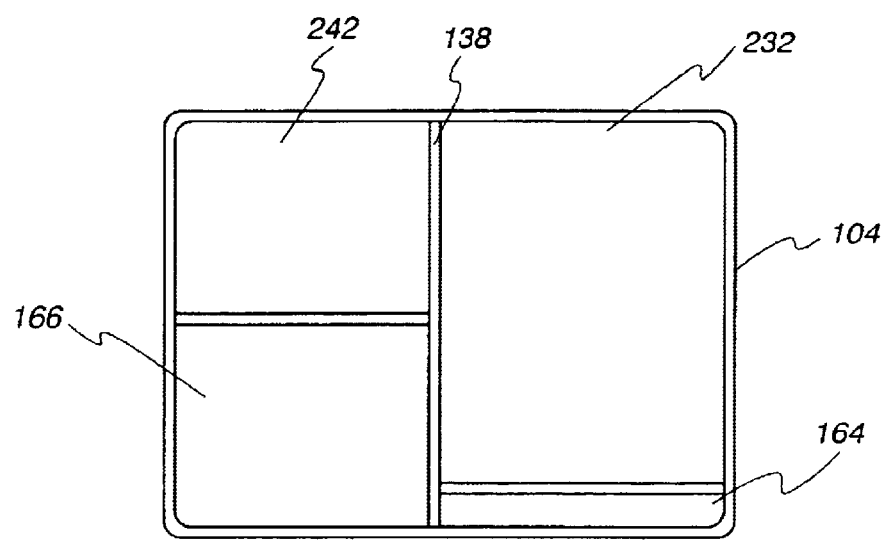
FIG. 3 is a somewhat diagrammatic cross-section of the apparatus of FIG. 1 taken at lines 3—3.
Figure 4:
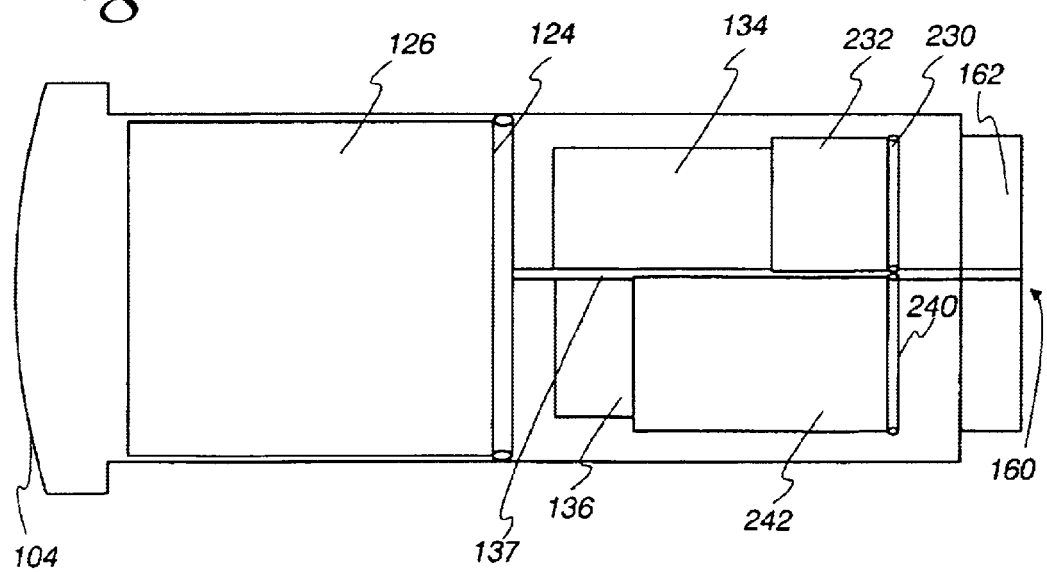
FIG. 4 is a somewhat diagrammatic cross-section of the apparatus of FIG. 1 taken at lines 4—4.

Turning now to FIG. 3, a cross-sectional view taken at lines 3—3 shows the airflow through the first passageway through the second chamber 129 to the floor outlet 160. In particular, the orientation of the passenger door 242 allows a greater amount of airflow to exit the passenger floor outlet 166 as compared to the amount of airflow allowed to pass through the driver floor outlet 164 based upon the orientation of the driver door 232. Similarly, FIG. 4 shows the amount of airflow allowed to pass through the defrost outlet 110 and the panel outlet 130. In particular, the defrost door 126 is shown blocking the airflow through the defrost outlet 110. The orientation of the driver door 232 shows a greater amount of airflow passing through the driver panel outlet 134 than allowed to pass through the passenger panel outlet 136 based upon the orientation of the passenger door 242.

Figure 5:
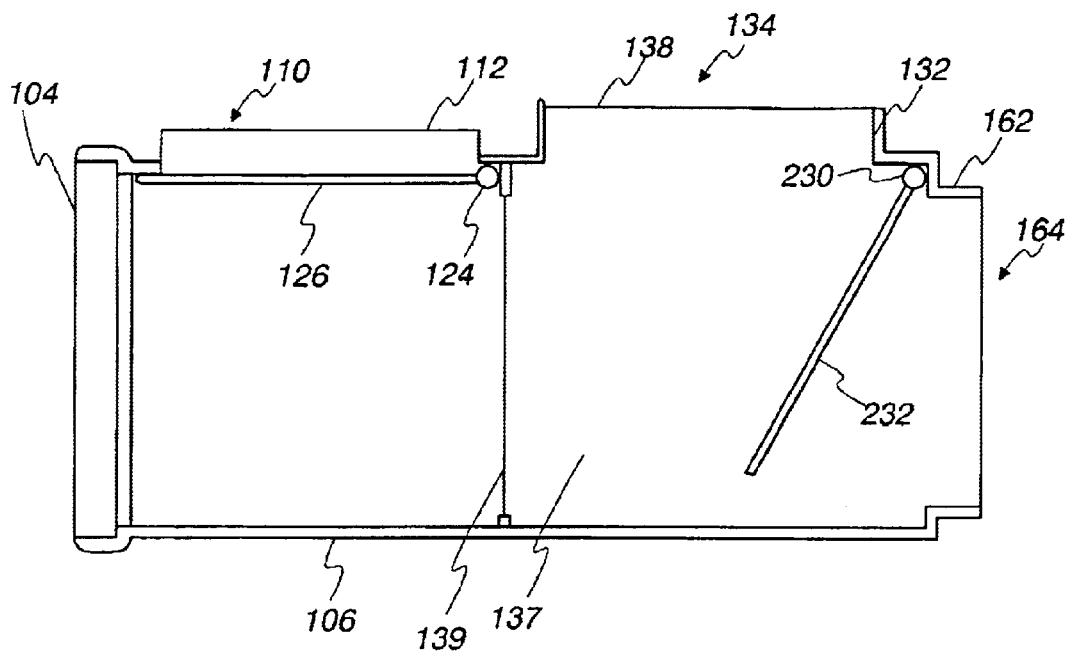
FIG. 5 is a somewhat diagrammatic cross-section of the apparatus of FIG. 1 taken at lines 5—5.
Figure 6:
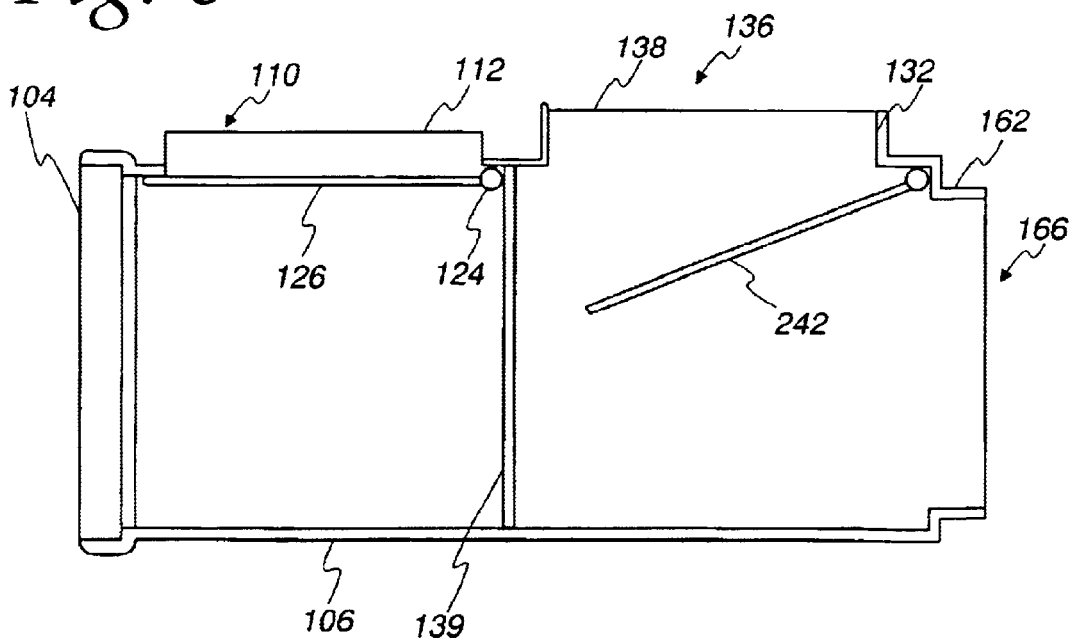
FIG. 6 is a somewhat diagrammatic cross-section of the apparatus of FIG. 1 taken at lines 6—6.

Turning now to FIG. 5, a cross-sectional view taken at line 5—5 shows the orientation of the defrost door 126 and the driver door 232 with respect to the various outlets. In particular, the defrost door 126 blocks the defrost outlet 110. In contrast, the driver door 232 is oriented in such a position to allow a certain portion of airflow to pass through the driver panel outlet 134 and the driver floor outlet 164. As shown in the similar cross-section of FIG. 6 taken at line 6—6, the orientation of the passenger door 242 shows the airflow through the passenger panel outlet 134 and the passenger floor outlet 166.

Turning now to FIG. 7, a flow chart shows a method for controlling airflow in a vehicle according to the one embodiment of the invention. In particular, the airflow to a defrost outlet and a second chamber is controlled with a door at a step 702. The airflow from the second chamber to a panel and floor outlet on a driver side is controlled with a second door at a step 704. Similarly, the air floor from the second chamber to a panel and floor outlet on a passenger side is controlled with a third door at a step 706.

Turning now to FIG. 8, a method for controlling airflow according to one embodiment of the present invention is shown. A first door is provided for controlling the airflow out of a first chamber at a step 802. The airflow between the defrost outlet in a second chamber is controlled by the orientation of the first door at a step 804. The second chamber is preferably divided into a driver portion and a passenger portion at a step 806. Such a division could be within the chamber by positioning a wall to create a driver portion and passenger portion. Alternatively, such a division could be accomplished by dividing the ducts at the outlet portion of the second chamber generally, as described in reference to FIGS. 1 and 2. In either case, doors are used for regulating the airflow to panel and floor outlets of driver and passenger zones of a vehicle. In particular, a second door for controlling the airflow out of the driver portion is provided at a step 808. The position of the second door is varied to control the amount of airflow in the second chamber to a driver panel outlet and a driver floor outlet at a step 810. Finally, a third door for controlling the airflow out of the passenger portion is provided at a step 812. The position of the third door is varied to control the amount of airflow to a passenger panel outlet and a passenger flow outlet at a step 814.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. As an example, although a divider wall 137 is shown in FIGS. 1 and 2, the apparatus for controlling airflow of the present disclosure could be used without a divider 137. For example, a division could be accomplished by dividing the panel outlet 130 and floor outlet 160 at the panel outlet shoulder portion 132 or the floor outlet shoulder portion 162, respectively. Alternatively, air ducts leading to vents in the vehicle could be divided to achieve the division of airflow. Further, the airflow control apparatus could be employed in other areas of the vehicle, such as to control air in a sleeper module of a truck between floor ducts and bunk registers. That is, door 126 could control airflow between the floor and the bunks, while doors 242 and 252 could control airflow in the two bunks (i.e., between the foot and head areas of the two bunks). Alternatively, an airflow control apparatus could include only two motors and two doors to control airflow to the floor and one bunk and the floor and a second bunk. It is therefore contemplated that the appended claims will cover any such modifications or embodiments that fall within the true scope of the invention.

I claim:

1. An airflow control apparatus having a plurality of doors and outlets for controlling an airflow in a vehicular HVAC system, said apparatus comprising:

a housing having a inlet for receiving the airflow;

a first chamber of said housing controlled by a first door, and having a first outlet and a first passage; and a second chamber of said housing coupled to said first passage and controlled by said first door, a second door and a third door, said second chamber having a second outlet and a third outlet, wherein said second and third doors each control the airflow to both said second and third outlets.

2. The apparatus of claim 1 wherein said first door is movable to any position between an open position enabling substantially all of the airflow in said first chamber to exit said first outlet and a closed position enabling substantially all of the airflow in said first chamber to enter said first passage.

3. An airflow control apparatus having a plurality of doors and outlets for controlling an airflow in a vehicular HVAC system, said apparatus comprising:

a housing having an inlet for receiving the airflow;

a first chamber of said housing controlled by a first door, and having a first outlet and a first passage;

a second chamber of said housing coupled to said first passage and controlled by said first door, a second door and a third door, said second chamber having a second outlet and a third outlet, wherein said second and third doors each control the airflow to said second and third outlets;

a wall dividing said second chamber into a third chamber and a fourth chamber; and wherein said second door is movable within said third chamber to any position between a first position enabling substantially all of the airflow to a driver zone to exit a panel outlet and a second position enabling substantially all of the airflow to said driver zone to exit a floor outlet.

4. An airflow control apparatus having a plurality of doors and outlets for controlling an airflow in a vehicular HVAC system, said apparatus comprising:

a housing having an inlet for receiving the airflow;

a first chamber of said housing controlled by a first door, and having a first outlet and a first passage;

a second chamber of said housing coupled to said first passage and controlled by said first door, a second door and a third door, said second chamber having a second outlet and a third outlet, wherein said second and third doors each control the airflow to said second and third outlets;

a wall dividing said second chamber into a third chamber and a fourth chamber; and wherein said third door is movable within said fourth chamber independent of said second door to any position between a first position enabling substantially all of the airflow to a passenger zone to exit a panel outlet and a second position enabling substantially all of the airflow to said passenger zone to exit a floor outlet.

5. An airflow control apparatus having a plurality of doors and outlets for controlling an airflow in a vehicular HVAC system, said apparatus comprising:

a first chamber having a first outlet and a first passage;

a first door controlling the airflow to said first outlet and said first passage;

a second chamber coupled to said first passage and having a second outlet and a third outlet;

a wall dividing said second chamber into a third chamber for providing airflow to a driver zone and a fourth chamber for providing airflow to a passenger zone;

a second door positioned in said third chamber, wherein said second door controls airflow from said third chamber to said second and third outlets; and a third door positioned in said fourth chamber, wherein said third door controls airflow from said fourth chamber to said second and third outlets independent of said second door.

6. The apparatus of claim 5 wherein said first outlet comprises a defrost outlet, said second outlet comprises a panel outlet and said third outlet comprises a floor outlet.

7. The apparatus of claim 6 wherein said first door is movable between an open position enabling substantially all of the airflow to exit said defrost outlet and a closed position enabling substantially all of the airflow to enter said first passage.

8. The apparatus of claim 5 wherein said second door is movable between a first position enabling substantially all of the airflow in said third chamber to exit by way of a driver panel outlet and a second position enabling substantially all of the airflow in said third chamber to exit by way of a driver floor outlet.

9. The apparatus of claim 5 wherein said third door is movable between a first position enabling substantially all of the airflow in said fourth chamber to exit by way of a passenger panel outlet and a second position enabling substantially all of the airflow in said fourth chamber to exit by way of a passenger floor outlet.

10. An airflow control apparatus having a plurality of doors and outlets for controlling an airflow in a vehicular HVAC system, said apparatus comprising:

a first chamber having a defrost outlet and a first passage;

a first door controlling the airflow to said defrost outlet and said first passage;

a second chamber and a third chamber to receive the airflow from said first passage;

a second door positioned in said second chamber for controlling airflow to a driver panel outlet and a driver floor outlet; and a third door positioned in said third chamber for controlling airflow to a passenger panel outlet and a passenger floor outlet independent of said second door.

11. An airflow control apparatus having a plurality of doors and outlets for controlling an airflow in a vehicular HVAC system, said apparatus comprising:

a first passage controlled by a first door;

a first outlet controlled by a second door and a third door operating independent of the other, wherein said second door and said third door control the airflow from said first passage through said first outlet to a first zone and a second zone, respectively; and a second outlet controlled by said second door and said third door, each operating independent of the other, wherein said second door and said third door control the airflow from said first passage through said second outlet to a third zone and a fourth zone, respectively.

12. The apparatus of claim 11 further comprising a third outlet, wherein said first door is movable between a substantially open position enabling substantially all of the airflow to exit said third outlet and a substantially closed position enabling substantially all of the airflow to enter said first passage.

13. The apparatus of claim 12 further comprising a first chamber and a second chamber connected by said first passage to direct airflow from said first chamber to said first outlet and said second outlet through said second chamber.

14. The apparatus of claim 13 further comprising a wall dividing said second chamber into a third chamber and a fourth chamber.

15. The apparatus of claim 14 wherein said wall further divides said first outlet into a fourth outlet and a fifth outlet and divides said second outlet into a sixth outlet and a seventh outlet.

16. The apparatus of claim 15 wherein said second door is movable between a first position enabling substantially all of the airflow to exit said fourth outlet and a second position enabling substantially all of the airflow to exit said sixth outlet.

17. The apparatus of claim 15 wherein said third door is movable between a first position enabling substantially all of the airflow to exit said fifth outlet and a second position enabling substantially all of the airflow to exit said seventh outlet.

18. An airflow control apparatus having a plurality of doors and outlets for controlling an airflow in a vehicular HVAC system, said apparatus comprising:

a first outlet controlled by a first door;

a first passage controlled by said first door, wherein said first door is movable to any position between an open position enabling substantially all of the airflow to exit said first outlet and a closed position enabling substantially all of the airflow to enter said first passage;

a second outlet connected to said first passage and controlled by a second door and a third door, each operating independent of the other, wherein said second and third doors control the amount of airflow through said second outlet to a driver zone and a passenger zone, respectively; and a third outlet connected to said first passage and controlled by said second door and said third door, each operating independent of the other, wherein said second and third doors control the amount of airflow through said third outlet to a driver zone and a passenger zone, respectively.

19. The apparatus of claim 18 further comprising a wall dividing said second outlet into a fourth outlet and a fifth outlet.

20. The apparatus of claim 19 wherein said wall further divides said third outlet into a sixth outlet and a seventh outlet.

21. The apparatus of claim 20 wherein said second door is movable to any position between a first position blocking the airflow from exiting said fourth outlet to a panel vent on said driver zone and a second position blocking airflow from exiting said sixth outlet to a floor vent on said driver zone.

22. The apparatus of claim 21 wherein said third door is movable to any position between a first position blocking airflow from exiting said fifth outlet to a panel vent on said passenger zone and a second position blocking airflow from exiting said seventh outlet to a floor vent on said passenger zone.

23. An airflow control apparatus having a plurality of doors and outlets for controlling an airflow in a vehicular HVAC system, said apparatus comprising:

a defrost outlet controlled by a first door;

a first passage controlled by said first door, wherein said first door is movable between an open position enabling substantially all of the airflow to exit said defrost outlet and a closed position enabling substantially all of the airflow to enter said first passage;

a panel outlet coupled to receive the airflow by way of said first passage;

a floor outlet coupled to receive the airflow by way of said first passage;

a wall dividing said panel outlet into a driver panel outlet and a passenger panel outlet and dividing said floor outlet into a driver floor outlet and a passenger floor outlet;

a second door for controlling the airflow to said driver panel outlet and said driver floor outlet; and a third door for controlling the airflow to said passenger panel outlet and said passenger floor outlet.

24. An airflow control apparatus having a plurality of doors and outlets for controlling an airflow in a vehicular HVAC system, said apparatus comprising:

a housing having an inlet for receiving the airflow:

a first door movable within said housing between a first position and a second position for controlling the airflow to a first outlet and a first passage;

a second door movable within said housing between a first position and a second position for controlling a first portion of the airflow received from said first passage and directed to a driver side of a vehicle;

a third door movable within said housing between a first position and a second position for controlling a second portion of the airflow received from said first passage and directed to a passenger side of a vehicle;

a second chamber connected to the first passage to receive the airflow therefrom and having a wall dividing said second chamber into a third chamber and a fourth chamber;

a second outlet and a third outlet wherein the second outlet comprises a panel outlet and said third outlet comprises a floor outlet; and further comprising a wall dividing said panel outlet into a driver panel outlet and a passenger panel outlet and said floor outlet into a driver floor outlet and a passenger floor outlet.

25. The apparatus of claim 24 wherein said second door is movable within said third chamber between a first position enabling substantially all of the airflow in said third chamber to exit said driver panel outlet and a second position enabling substantially all of the airflow in said fourth chamber to exit said driver floor outlet, and wherein said third door is movable within said fourth chamber between a first position enabling substantially all of the airflow in said fourth chamber to exit said passenger panel outlet and a second position enabling substantially all of the airflow in said fourth chamber to exit said passenger floor outlet.

26. An airflow control apparatus having a plurality of doors and outlets for controlling an airflow in a vehicular HVAC system comprising:

a first door movable between a first position and a second position for controlling the airflow to a defrost outlet and a first passage leading to a panel outlet and a floor outlet;

a wall dividing said panel outlet into a driver panel outlet and a passenger panel outlet and dividing said floor outlet into a driver floor outlet and a passenger floor outlet;

a second door movable between a first position and a second position for controlling the airflow received from said first passage and provided to said driver panel outlet and said driver floor outlet; and a third door movable between a first position and a second position for controlling the airflow received from said first passage and provided to said passenger panel outlet and said passenger floor outlet.

27. A method of controlling an airflow in a vehicular HVAC system, said method comprising the steps of:

receiving the airflow into a first chamber of a housing;

controlling the airflow from said first chamber to a second chamber of a housing with a first door; and controlling the airflow from said second chamber to a first zone with a second door; wherein said step of controlling airflow from said second chamber to a first zone comprises dividing the airflow from said first chamber between a fourth outlet and a sixth outlet with said second door, and wherein said step of controlling airflow from said second chamber to a second zone comprises dividing the airflow from said first chamber between a fifth outlet and a seventh outlet with aid third door.

28. A method of controlling airflow in a vehicular HVAC system, said method comprising the steps of:

directing an airflow into a chamber;

controlling the airflow from a first portion in said chamber to a driver zone of said vehicle by way of a driver panel outlet and a driver floor outlet with a door; and controlling the airflow from a second portion in said chamber to a passenger zone of said vehicle by way of a passenger panel outlet and a passenger floor outlet with another third door.

29. A method of controlling airflow in a vehicular HVAC system, said method comprising the steps of:

providing a first chamber having a first outlet and a first passageway;

varying the position of a first door to control the amount of airflow that passes out of said first outlet and to control the amount of airflow that passes to a second chamber by way of said first passageway;

varying the position of a second door to control the airflow from said second chamber to a driver zone; and varying the position of a third door to control the airflow from said second chamber to a passenger zone.

30. The method of claim 29 wherein said step of varying the position of a first door comprises controlling the amount of airflow passing to a defrost outlet and said second chamber.

31. The method of claim 29 wherein said step of varying the position of a second door comprises dividing the airflow between a driver panel outlet and a driver floor outlet with said second door.

32. The method of claim 29 wherein said step of varying the position of a third door comprises dividing the airflow between a passenger panel outlet and a passenger floor outlet with said third door.

33. The method of claim 29 wherein said step of varying the position of a second door comprises controlling the airflow to said driver zone with said second door by way of a fourth outlet and a sixth outlet.

34. The method of claim 33 wherein said step of varying the position of a third door comprises controlling the airflow said passenger zone with said third door by way of a fifth outlet and a seventh outlet.

35. A method of controlling airflow in a multi-chamber apparatus of a vehicular HVAC system, said method comprising the steps of:

provluing a first chamber having a first outlet and a first passageway;

varying the position of a first door to control the amount of airflow that passes from said first outlet and to control the amount of airflow that provided to a second chamber by way of said first passageway;

varying the position of a second door to control the airflow from said second chamber passing to a driver zone through a driver panel outlet and a driver floor outlet; and varying the position of a third door to control the airflow from said second chamber passing to a passenger zone through a passenger panel outlet and a passenger floor outlet.

* * * * *